United States Patent [19]

Sharangpani

[11] Patent Number: 5,740,093
[45] Date of Patent: Apr. 14, 1998

[54] 128-BIT REGISTER FILE AND 128-BIT FLOATING POINT LOAD AND STORE FOR QUADRUPLE PRECISION COMPATIBILITY

[75] Inventor: Harshvardhan Sharangpani, Santa Clara, Calif.

[73] Assignee: Intel Corporation, Santa Clara, Calif.

[21] Appl. No.: 575,912

[22] Filed: Dec. 20, 1995

[51] Int. Cl.[6] ........................................... G06F 7/38
[52] U.S. Cl. ........................ 364/748.19; 364/748.16
[58] Field of Search .................... 364/748.19, 748.16

[56] References Cited

U.S. PATENT DOCUMENTS

| Re. 33,629 | 7/1991 | Palmer et al. | 364/748.16 |
|---|---|---|---|
| 4,884,231 | 11/1989 | Mor et al. | 364/748.19 |
| 5,182,723 | 1/1993 | Kamimura | 364/748.19 |
| 5,268,855 | 12/1993 | Mason et al. | 364/748.19 |
| 5,523,961 | 6/1996 | Naini | 364/748.19 |
| 5,631,859 | 5/1997 | Markstein et al. | 364/748.19 |

OTHER PUBLICATIONS

IEEE Standard for Binary Floating–Point Arithmetic (ANSI/IEEE Std 754–1985).
IEEE Standard for Radix–Independent Floating–Point Arithmetic (ANSI/IEEE Std 854–1987).
MC88110 Second Generation RISC Microprocessor User's Manual; Motorola Inc., 1991.

*Primary Examiner*—David H. Malzahn
*Attorney, Agent, or Firm*—Blakely, Sokoloff, Taylor & Zafman

[57] ABSTRACT

A technique for providing adaptive 128-bit load and store operations to support architecture extensions for computations on a 128-bit quadruple precision format, in which a single set of load and store instructions provides for save and restore operations on both 80-bit and 128-bit floating point register files. A 128-bit load and store instructions are utilized for moving values that are 128-bit aligned in memory. The transfer entails the movement of data between a 128-bit memory boundary and a floating point register file for register save and restore operations. In one embodiment, 80-bit registers are used and in a second embodiment 128-bit registers are used. The same instructions operate on both the 80-bit and 128-bit registers to map the content of a given register into a 128-bit boundary field in memory. A load/store unit allocates the bit positioning so that when 80-bit registers are used, the 80 bits are moved into the most significant bit positions of the 128-bit boundary field. The remaining bit positions are filled with 0's. When values are moved to memory the reverse operation is performed.

3 Claims, 10 Drawing Sheets

128-BIT REGISTER FILE AND 128-BIT FLOATING POINT LOAD AND STORE FOR QUADRUPLE PRECISION COMPATIBILITY

BACKGROUND OF THE INVENTION

1. Field of the Invention

The present invention relates to the field of microprocessors and, more particularly, to operations performed on a floating point unit associated with a microprocessor.

2. Related Application

This application is related to copending applications titled "Adaptive 128-Bit Floating Point Load And Store Operations For Quadruple Precision Compatibility;" Ser. No. 08/580,069; filed Dec. 20, 1997 and "Adaptive 128-Bit Floating Point Load And Store Instructions For Quad-Precision Compatibility;" Ser. No. 08/580,035; filed Dec. 20, 1997.

3. Prior Art

Generally, the use of floating point units within or in conjunction with a microprocessor unit is well-known in the art. Floating point units have the ability to support complex numerical and scientific calculations on data in floating point format. Calculations can be performed in single precision, but in many instances such calculations are performed in higher precision. Thus, it is typical for floating point units to provide support for double precision calculations, which will usually require support for twice the bit length on calculations, as well as on typical data transfers. For example, a processor utilizing a 32-bit single precision architecture to perform double precision calculations will require the manipulation of 64 (2×32) bits.

Some microprocessors have extended the floating point capability to beyond double precision. One microprocessor family, developed by Intel Corporation that is commonly referred to as the ×86 family of microprocessors (most notably, 80386, 80486 and Pentium® microprocessors), supports a numeric computational model that is based upon an extended precision floating point format. The extended precision is an extension of the 64-bit double precision format and conforms to ANSI/IEEE (American National Standard/The Institute of Electrical and Electronics Engineers) standard 754, which is titled "IEEE Standard for Binary Floating-Point Arithmetic." The IEEE 754 Standard specifies the requirements for performing single, double and extended precision floating point arithmetic. Single precision calls for a 32-bit length format and double precision requires 64 bits. The extended precision format may be defined to have a bit length of 80 bits. This extended precision format is a bit cumbersome since it is not an integer multiple of 32-bit word. However, it does provide significantly more precision over the double precision format, thus enhancing the reliability and integrity of the computation and making it less prone to the effects of roundoff.

Generally, in implementing designs to support integer and floating point operations, prior art processors have operated using 32-bit integer registers and either 64-bit or 80-bit floating point registers (depending on the precision format supported). It is anticipated that the next generation of microprocessors will provide support for 64-bit integer data and memory addressing, which will require 64-bit integer registers. It is also envisioned that floating point units will be further extended to provide support for computation and transfer of data having a bit-length of 128 bits. This 128-bit format is referred to as a quadruple (or "quad") precision format or quad word.

The reasons for this enhancement are many, but a central reason is due to software enhancement. As computational speeds increase, the software takes advantage of the central processing unit's (CPU's) performance and builds more elaborate and computationally intensive (and useful) models. Many of these models do not exist today, but will be developed in the future. Accordingly, as hardware performance improves, more elaborate and useful software programs will invoke calculations which will exploit the speed of the hardware, namely the CPU. With additional calculations, there is a need to further mitigate the effects of roundoff. Although the extended precision format mitigates the roundoff effects, floating point support for quad precision capability will provide significant additional precision as such software enhancements are made.

However, for a processor to have a floating point unit operating on a 128-bit architecture requires significant additional costs, if the enhancements are all implemented in hardware. It is envisioned that sometime in the future, a processor will be designed so that the hardware in the floating point unit will support the quad precision format. This will entail the presence of floating point registers having a bit-length of 128 bits. Correspondingly, 128-bit data transfers to and from these 128-bit floating point registers (such as to/from memory) will need to be supported. The operations performed by the floating point instructions will perform the quad precision calculations in the floating point unit. Note that on such a processor, the base functionality of the processor (such as the integer unit and bus transfers) can be achieved using 64-bit registers and data transfers. Thus, significant additional circuitry will be required to support this new 128-bit functionality.

Because of the additional capacity required on the microprocessor "chip" to implement support for the 128-bit floating point format, it is anticipated that support for this precision format will not be implemented completely in hardware until the cost of this hardware is reduced further. The cost reduction is anticipated from improved VLSI scaling and the benefits obtained from software evolution. Accordingly, it is envisioned that the transition to 128-bit quad precision capability will not occur immediately, at least where a commercially viable microprocessor is concerned. It is envisioned that such a transition will occur in stages, with one of the stages still using the older and narrower floating point register file.

However, a new problem arises when a floating point register file of less than 128 bits is retained in the processor in one (or more) of the transition stage(s). This new problem relates to the saving and restoring of floating point registers and program instructions which invoke the save and restore operations. That is, from time to time, data in the floating point registers are stored (saved) and then restored at a later time. The register save and restore operations are typically executed when the registers are needed for other operations, but the original data in them are still needed for later on-going calculations. It is important that the instructions that are used to save and restore the registers do so without the loss of information. This requires the entire register image to be moved into memory and later restored completely. Thus, to prevent data loss, programs which are written to invoke the save/restore operations on an 80-bit register would need to be rewritten in order to perform correctly (without data loss) on a future machine with a wider register, such as a 128-bit register. This is because save/restore instructions written for the 80-bit registers could potentially lose or corrupt information stored in the wider 128-bit register file when used in conjunction with programs using the wider format.

It is appreciated that one approach in addressing this problem is to place severe restrictions on the software which can run with each of the transition stages, as well as the final 128-bit processor architecture. However, this solution is not practical due to the inordinate amount of resources required to rewrite the software at each stage of processor development. A preferred approach is to provide for a mechanism which will allow the transition to occur with substantial compatibility, so that existing and future program routines can be made to inter-operate even though those routines were developed at different stages of processor architecture development.

Accordingly, in respect to floating point register save/ restore operations, a set of program instructions would be needed to operate with the 80-bit register architecture and a different set of program instructions would be needed for the 128-bit register architecture. However, if an adaptive save/ restore operation can be defined in which the saves/restores can be performed on both 80-bit and 128-bit register architectures, then the transition from 80-bit registers to 128-bit registers can be made much more smoothly with less effort in rewriting the software. Furthermore, such adaptability can enhance program development, since programs invoking the 80-bit register save/restore operations can be made to inter-operate in conjunction with programs invoking the 128-bit save/restore operations. Thus, currently existing program instructions and instructions which will be written during the transition stage(s) can be made to inter-operate with each other as hardware changes are made to the width of the floating point register file.

As was noted above, it is envisioned that processor development to the quad precision architecture will be achieved in stages. There are a number of approaches. One transition approach is to select a processor architecture where the quad precision calculations are emulated in software. That is, the floating point unit has hardware to support the single, double and extended precision calculations, but all quad precision calculations are performed in a software emulator. By utilizing such a processor, quad precision operations are supported without requiring significant additional hardware in the processor. Depending on the architecture, the floating point register file can be 128 bits wide or the registers can retain the earlier register file structure, such as the 80-bit wide registers.

The 128-bit floating point registers will be able to support the quad format, but will require additional die area on the chip to implement the 128-bit registers. Alternatively, the current 80-bit register structure can be retained, in which case additional chip area for increasing the register width will not be required, but quad format is not supported in the floating point registers. Whichever route the transition stage (s) take(s) will be based on design and cost constraints imposed on the processor architecture at that stage of development. However, with the adaptability of the save/ restore operations as described in reference to the present invention, the transition from 80-bit registers to 128-bit registers is made with operations which are adaptable to both architectures. Ultimately, when the full 128-bit architecture is implemented in hardware, all of the earlier developed program instructions will still inter-operate with program instructions of later generation.

Thus, a commercially viable approach is available to provide for an interim processor(s) which is inbetween the currently existing floating point architecture (of single, double and extended precision format) and the 128-bit (quad precision) architecture. There are a number of approaches in which the interim stage can be implemented. The present invention describes scenarios for implementing the interim stage(s). One approach is to provide a 128-bit register file in the floating point unit to support a new quad precision load and store instruction set. The other is to retain the current 80-bit register file in the floating point unit and provide for a means to transpose the 80 bits into a 128 bit field (and vice versa) in order to support the new load and store instructions when they are executed. By utilizing an adaptive load/store unit for the save/restore operations, the behavior of which depends upon the particular processor architecture generation, a single set of save/restore instructions need be written for operating on both 80-bit and 128-bit registers.

Accordingly, the present invention describes a scheme to enable a straight forward extension of the current architecture to eventually support quad precision floating point units, yet allowing for code (operating systems, compiler generated programs, etc.) written for previous generation machines to "run" successfully on successive generation machines, specifically in regard to saves and restores issued by these codes, to save and restore the floating point registers without information loss.

SUMMARY OF THE INVENTION

The present invention describes a technique for providing adaptive 128-bit load and store operations to support architecture extensions for computation on a 128-bit quadruple precision format, in which a single set of load and store (load/store) instructions provides for save/restore operations on both 80-bit and 128-bit floating point register files. New adaptive load and store instructions are utilized for moving values that are 128-bit aligned in memory. The transfer entails the movement of data between a 128-bit memory boundary and a floating point register file. The load/store instructions are used for register save/restore operations, which are required for context switching between programs and register allocation requirements within a program.

In one embodiment, the current 80-bit floating point registers are retained in the floating point unit to support single, double and extended precision calculations being performed by a floating point execution unit(s). The quad precision calculations are supported by a software emulator. Although the quad precision operation is not supported in hardware, load and store instructions designed and written for the 128-bit format are used to transfer values between the floating point register file and memory for register save and restore operations. A load/store unit within the floating point unit performs the bit transfer and mapping when the new load and store instructions are executed.

During a store operation, 80 bits from a floating point register are moved to the 80 most significant bit positions of a 128-bit boundary field memory. The load/store unit fills the least significant 48 bit positions of the 128-bit field with zeroes. Conversely, during a load operation the 80 most significant bits from the 128-bit field in memory are moved to a floating point register, while the least significant 48 bits are discarded. Thus, the 80 bits from a register are mapped left-aligned into a 128-bit field. The store and load instructions are used to execute register save and restore operations as required by a program. Accordingly, the instructions allow for compatibility so that programs written for the earlier generation 80-bit floating point architecture can operate using the new 128-bit load/store instructions for saving and restoring floating point registers.

A second embodiment is an extension of the first in which the floating point registers are now replaced by 128-bit registers. The quad operations are still supported by the software emulator, however, now the floating point registers can support the quad word format. Since one-to-one bit position transfers are now permitted between the floating point register file and the 128-bit boundary field in memory, bit filling and discarding operations are not required by the load/store unit. However, because of the compatibility of the instructions in bit allocation and placement, the same load/store instructions can be used to effect the transfers for saving and restoring the floating point registers.

Ultimately, a new floating point architecture with full hardware support for quad precision operations will emerge in a future processor. The load/store instructions of the present invention will also be compatible with this envisioned 128-bit architecture for saving and restoring the floating point registers. Thus, by the utilization of the load/store instructions of the present invention, a commercially viable approach to processor enhancements in stages can be achieved, but wherein only one set of load and store instructions for saving and restoring the floating point registers need to be written for all of the stages.

The compatibility obtained from the use of the load and store instructions of the present invention allows for current generation software to be supported by enhanced versions of microprocessor floating point architecture.

The enhancements can occur in stages ultimately resulting in a fully supported 128-bit quadruple precision floating point architecture. The ability to develop quad precision capability in stages permits enhancements to be introduced on a cost efficiency basis. Furthermore, the need to write a set of floating point load and store instructions only once for all these stages also saves considerable software development cost.

DETAILED DESCRIPTION OF THE PREFERRED EMBODIMENT

A technique for providing adaptive 128-bit load and store operations to support architecture extensions for computation on a 128-bit quadruple precision format, in which a single set of load and store (load/store) instructions provides for save/restore operations on both 80-bit and 128-bit floating point register files is described. In the following description, numerous specific details are set forth, such as specific data words, bit length, data transferring techniques, circuit diagrams, etc., in order to provide a thorough understanding of the present invention. However, it will be obvious to one skilled in the are that the present invention may be practiced without these specific details. In other instances, well known techniques and circuitry have not been described in detail to avoid obscuring the present invention. It is to be noted that an embodiment of the present invention is described in which contents of floating point registers having a bit-length of 80 bits are stored in memory as 128-bit data and loaded back into the registers as 80-bit data, by the use of load and store instructions of the present invention. In another embodiment, the same load and store instructions are used to load and store 128-bit data from 128-bit floating point registers. However, it is readily understood that other embodiments can be designed and implemented utilizing different bit lengths without departing from the spirit and scope of the present invention.

Figure 1:
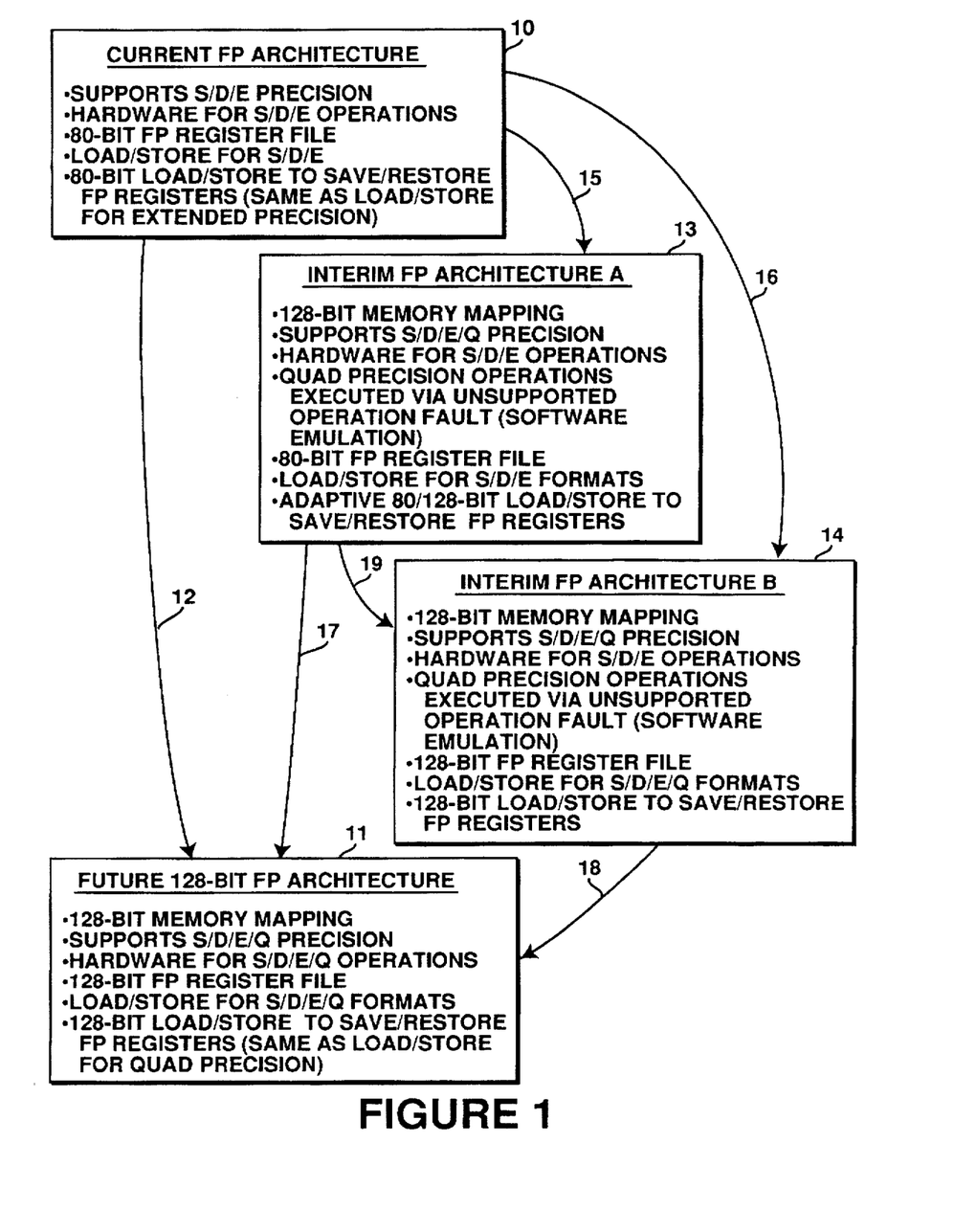
FIG. 1 is an architectural block diagram showing a current floating point architecture, an envisioned future floating point architecture and two interim floating point architectures of the present invention.

Referring to FIG. 1, a block diagram illustrating four different floating point architectures is shown. The prior art architecture is shown in block 10. The current floating point architecture, which is typically implemented within an integrated circuit microprocessor, has the attributes noted in block 10. In this floating point architecture, the floating point unit of the processor is capable of supporting single, double and extended precision formats. Further, the floating point unit is capable of performing floating point operations for all three precision formats. That is, there is hardware circuitry in the floating point unit to execute these floating point operations. Since the longest precision format requires operations on 80 bit-length data, registers in a floating point register file are designed to accommodate a bit-length of 80 bits. Accordingly, load and store (load/store) operations can load and store data in single, double and extended precision format to and from the floating point registers. Load/store operations to save and restore (save/restore) the floating point registers require the movement of 80 bits from a floating point register to a location in memory and back again to the register. On this architecture, these instructions turn out to be identical to the load/store for extended precision. The hardware and software diagrams for the processor system architecture, as they apply to the load and store operations, are shown in FIGS. 2 and 3.

Figure 2:
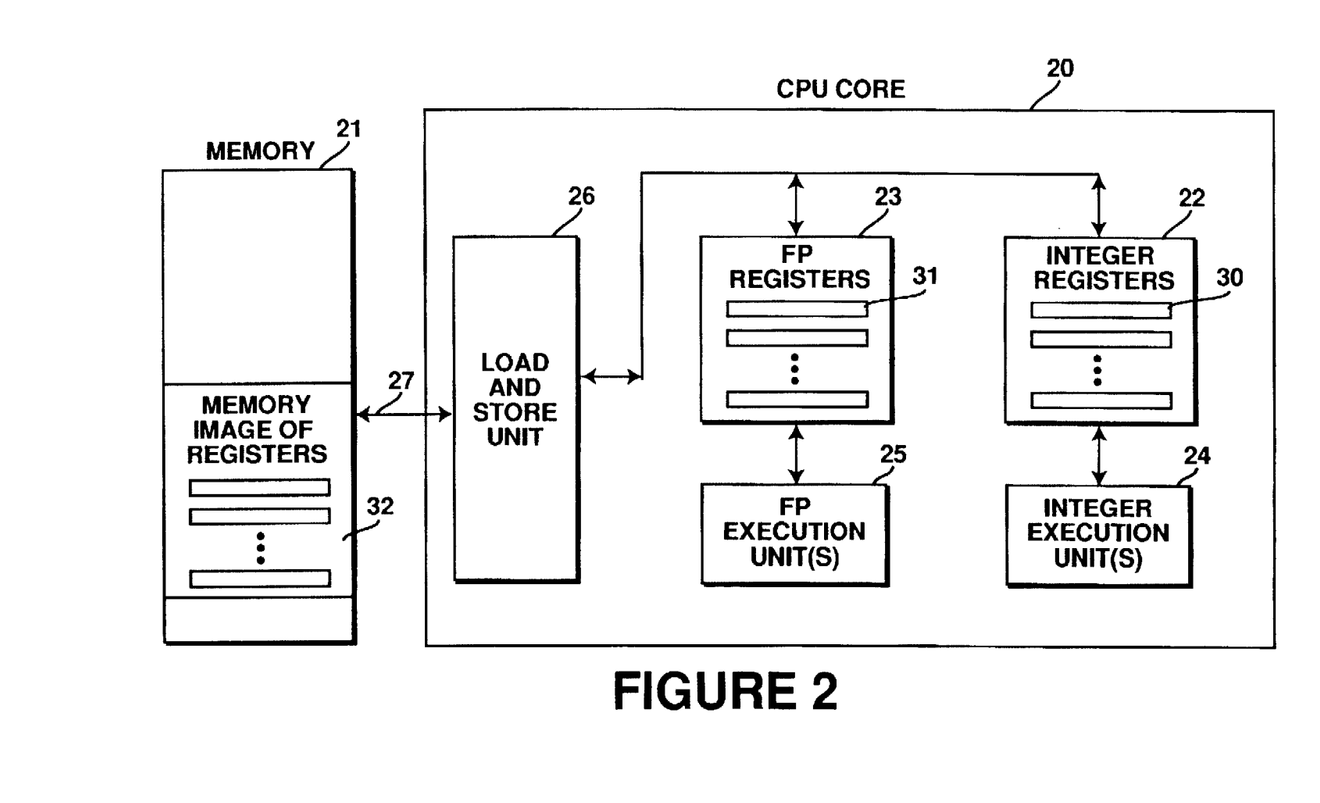
FIG. 2 is a circuit block diagram showing a coupling between a memory and a processing core of a processor, which core includes integer and floating point units and a load/store unit for transferring information between registers of the integer and floating point units and locations in memory.
Figure 3:
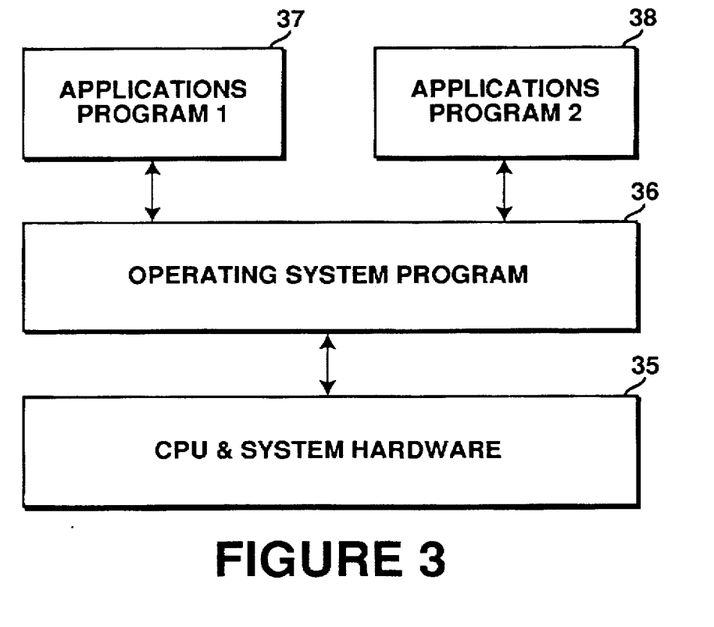
FIG. 3 is functional block diagram showing an interrelationship of an operating system program to two applications programs and computer hardware.

In FIG. 2 a hardware diagram is shown in which a CPU core 20 (which is part of the microprocessor "chip") is coupled to memory 21. CPU core 20 includes a floating point register file 23, having a plurality of floating point registers 31, and an integer register file 22, having a plurality of integer registers 30. One or more floating point execution unit(s) is/are coupled to register file 23 to perform floating point operations on data stored in the floating point registers 31. Similarly, one or more integer execution unit(s) is/are coupled to register file 22 to perform integer operations on data stored in the integer registers 30. Typically, the register files 22–23 are coupled to memory 21 by a bus 27 through a load and store unit 26 for transfer of information between the registers 30–31 and memory 21.

The load/store unit 26 responds to load and store instructions to load data from memory 21 to a selected register in the CPU core 20. Typically, there are load and store instructions for the integer registers 30 for the movement of integer data and a separate floating point load and store instructions for the floating point registers 31. The present invention pertains to the instructions for the movement of data to and from the floating point registers 31. However, it should be noted that one set of load and store instructions can operate on both integer and floating point data, if so designed into the architecture. Accordingly, a store instruction stores the contents of a selected register 31 into a selected memory location within memory 21. Conversely, a load instruction loads the contents of a selected memory location of memory 21 into a selected register 31.

It is to be appreciated that memory 21 can be of a variety of memories used to store information for use by a processor. Thus, block 21 represents memory in general, so that memory 21 can be cache memory, RAM (random-access-memory) main memory, mass storage memory (such as a magnetic "hard disk" device), etc. However, for speed and performance, memory 21 in most current state-of-the-art processors is cache memory that is located on the same integrated circuit chip as the processor (referred to as "internal" cache).

Within memory 21 are a set of locations 32 identified as memory image of registers. The actual location where this register image is located is not important as long as some location is allocated for storing the register image when required. As will be described later in reference to FIGS. 4 and 5, there are instances in which data stored in a register (as well as the status of the particular register) will need to be stored in memory and then later retrieved to restore the register(s) into the original state. Thus, a register image is made in memory at location 32 and then this image is used to restore the register at a later time. This operation is performed for both integer and floating point registers 30 and 31, but again the present invention is directed to floating point registers 31.

It is to be appreciated that only those elements needed for the understanding of the present invention are shown in FIG. 2. Thus, other structures normally within or associated with a processor, but not needed for the understanding of the present invention are not illustrated. Furthermore, structures and operations, such as for fetching, decoding and executing instructions are not shown, since such structures and steps are known in the art.

Referring to FIG. 3, a software hierarchy is illustrated in block diagram form. The CPU and the associated system hardware (such as a memory) that comprise a computer system is shown as block 35. An operating system software is shown as block 36. The operating system software is the underlying control program which provides the instructions to control the hardware in block 35. A particular operating system is dependent on the instruction set architecture of the particular processor being utilized. A number of application programs (shown in this diagram by two applications named Program 1 and Program 2 in blocks 37 and 38, respectively) provide software routines for specific tasks. The operating system software provides the control program interface between the application programs and the hardware. In many instances compilers are used to compile the applications code.

While the processor is operating and executing program instructions, there are instances when a register content (and associated status) will need to be saved in memory 21. The content and status information for each register being saved are stored in appropriate location(s) 32 within memory 21. A store instruction is used to store the register content in memory 21. Subsequently, a load instruction is used to restore the original content to the register. There are a number of reasons why registers need to be saved and two examples are described in reference to FIGS. 4 and 5.

Figure 4:
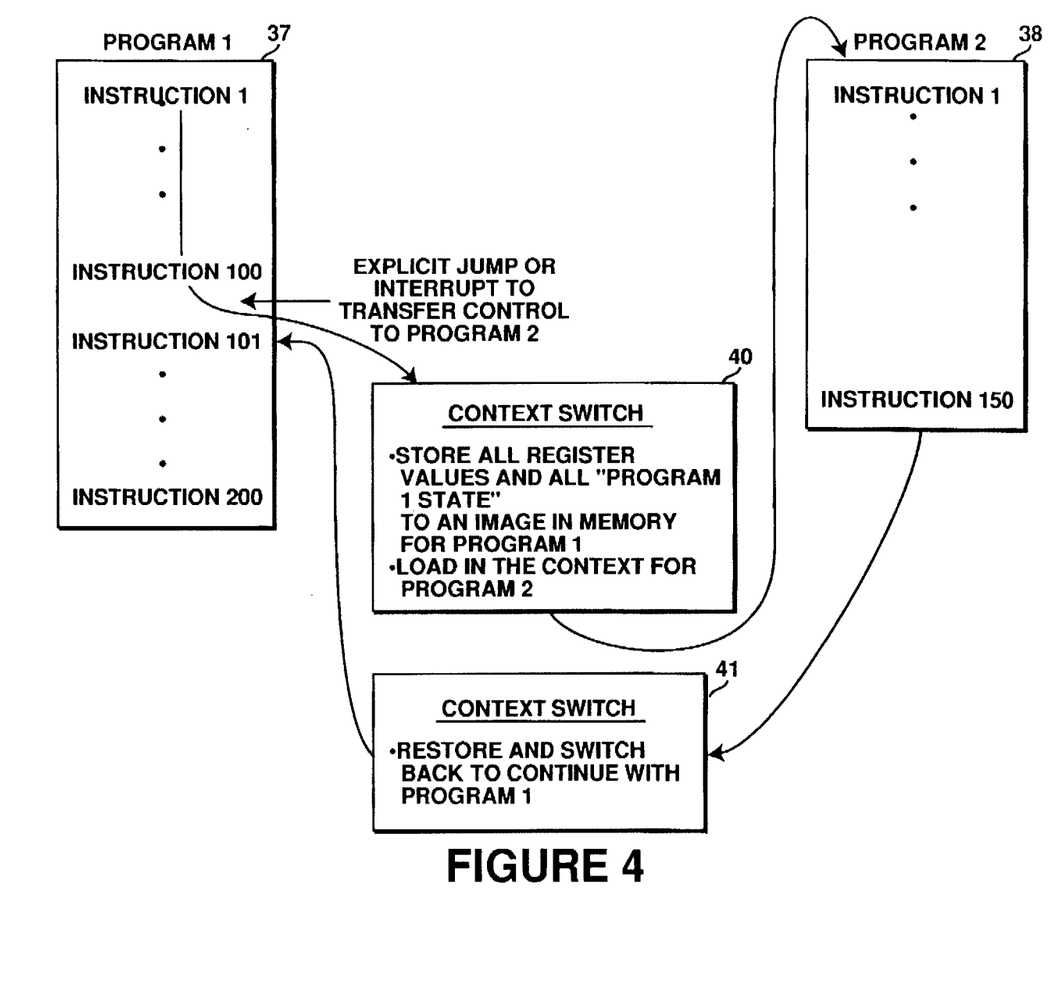
FIG. 4 is a block diagram illustrating context switching between two programs in which register values are stored to memory and later restored.

In FIG. 4, Program 1 is shown having 200 instruction lines and Program 2 is shown having 150 instruction lines. The actual number of instructions is immaterial to the practice of the present invention and are shown herein for illustrative purpose. Initially, Program 1 (shown by block 37) is executing its instructions. At instruction 100 an explicit jump or an interrupt is received to transfer control of the processor execution to Program 2 (shown by block 38). At this point a context switch is made to transfer the program control to Program 2. All register values and register "states" for Program 1 are stored in memory. The operating system ensures that the context switch causes an image of the registers used by Program 1 to be stored in memory 21. This context switching is shown in block 40. Then the register values needed for Program 2 are loaded into the registers, in order to run Program 2. Because there is a register image in memory, the register values of Program 1 at instruction 100 are saved and the registers are now available for use by Program 2.

After Program 2 has run its instruction routine, the context switch is again made, in order to transfer control back to Program 1. At this point, the register content and status in memory 21 are loaded back, so that the registers, previously suspended when Program 1 was interrupted, are now restored to their state at instruction 100. This context switching is shown in block 41. Then Program 1 can continue with instruction 101. In actual practice, there may be a number of context switching before a program completes its set of instructions. Furthermore, although only two programs are shown in FIG. 4, there may be more application programs vying for control so that there may be many context switches involving these different programs. What is important to note is that the context switching requires that the floating point registers be saved by having an "image" of the registers stored in memory.

Figure 5:
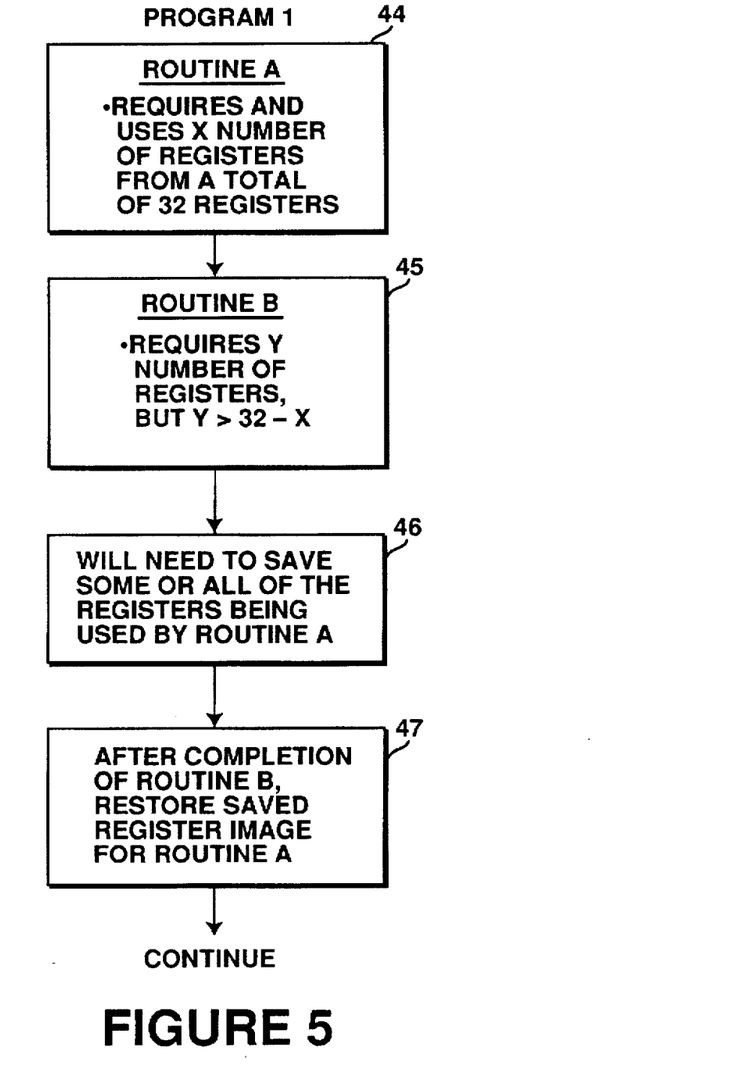
FIG. 5 is a block diagram illustrating register save and restore operations when routines in a single program require more registers than the number available.

FIG. 5 illustrates a second example in which registers need to be saved in memory 21. In FIG. 5 a single program (Program 1 in this instance) is shown in which a number of routines comprise the program. Routine A is shown in block 44 and Routine B is shown in block 45. When Routine A is executing, it requires a certain number of registers (X in this instance). Assuming that the floating point register file has 32 registers available. Then 32-X registers are unused. If Routine B is now to be executed and if Routine B requires Y number of registers (where Y is greater than 32-X), not enough registers are available for Routine B. As shown in block 46, in this instance some or all of the registers for Routine A must be stored in memory 21. After the completion of Routine B, the register image for Routine A is restored so that Program 1 can continue with Routine A. This is shown in block 47. It is appreciated that in a processor with efficient register allocation, the number of moves to and from memory are minimized and only that number of registers needed to be freed are actually "imaged" in memory.

Thus, FIGS. 4 and 5 illustrate just two examples of situations in which floating point register contents are moved to and from memory to save an image of the register(s) and restore the original content. The switching and the saving of a register image are managed by the operating system. The operating system utilizes the store instruction to store the content of a register 31 to memory 21 and the load instruction to load the memory content back into the register to restore the original value in the register 31. Thus, in appreciating the load and store operation required of the present invention, it is important to understand that the operation entails the saving and restoring of a register image and that these operations are in addition to the normal loading and storing of data required by program instructions. These aspects of the load/store operation will be appreciated below in reference to the implementation of the present invention.

Referring to FIG. 1 again, it is appreciated that the current floating point architecture of block 10 utilizes load and store instructions which operate on floating point registers 31. The load and store instructions are capable of transferring data between memory 21 and registers 31 of the floating point register file 23. The floating point execution unit(s) 25 are capable of performing operations in single, double and extended precision as noted by the afore-mentioned IEEE 754 Standard. The registers 31 of the current floating point architecture have a bit-length of 80 bits to accommodate the format of the highest precision, which is the extended precision format. Accordingly, the saving/restoring of the floating point registers 31 require the movement of 80 bits to/from memory for each of the registers.

The load and store instructions for a processor implementing the current floating point architecture of block 10 support data manipulation of single, double and extended precision formats and the floating point unit supports calculations for the same three precision formats. Single precision requires the manipulation of a 32-bit word, double precision requires 64 bits and extended precision requires 80 bits. Furthermore, since the floating point registers are 80 bits wide, the floating point register contents are saved and restored using the same load and store instructions which move floating point data in the 80-bit format. It is to be noted that the value stored in the 80-bit floating point register can be of single, double or extended precision format. However, when the load/store operations are performed, all 80-bits are transferred. Thus, register transfers are performed at the bit length of the floating point registers, which is 80 bits wide in this instance.

Block 11 of FIG. 1 illustrates a 128-bit floating point architecture which is envisioned to be implemented in a future microprocessor. This future processor will more than likely be designed to accommodate a new quad (quadruple) precision floating point format, which is based on a 128-bit quad word. Thus, the future 128-bit floating point architecture will need to support single, double, extended and quad precision formats and have the hardware circuitry to support calculations for all four precision formats. Accordingly, since the quad precision format is the widest, floating point registers 31 will need to be 128 bits wide and the execution unit(s) 25 will need to support operations based on single, double, extended and quad precision formats. The load/store instructions will need to transfer data based on the four precision formats and the register save/restore operations to memory 21 will require the movement of a 128-bit quad word with no information loss, which could use the load/store instructions used for the quad precision format. Thus, the architecture of block 11 is a completely new architecture based on supporting quad precision operations in hardware.

The direct path of progressing from the current architecture of block 10 to the future envisioned 128-bit architecture of block 11 is shown by path 12. Although significant improvements can be derived by taking path 12, a number of significant disadvantages are to be noted as well. Some of the primary problems have been noted in the Background section above. Namely, the additional silicon chip "die" area needed to accommodate the additional 48 bits for each floating point register adds substantial cost. The wide multiplier arrays which will be needed in the floating point execution unit(s) also requires additional "die" area. The additional chip area required is difficult to obtain based on current VLSI scaling. It is also difficult to justify the cost given the state of the software development at the present time.

Furthermore, the software codes which are written to invoke the 80-bit floating point register save/restore operations will not be compatible with the future 128-bit floating point register architecture. A new set of software codes based on the 128-bit register format will need to be written. That is, the existing code based on the 80-bit floating point register architecture will not run properly on the processor implementing the future 128-bit floating point register architecture of block 11, since these codes would save/restore only 80 bits of the register image. Thus, significant additional cost will be incurred in rewriting software in order to save/restore a wider register image.

Accordingly, significant additional costs (due to both hardware and software) will be incurred in providing and supporting a 128-bit floating point architecture. The additional costs may not currently provide the benefit given the state of the current software development and these costs may out weigh the benefits of manufacturing a commercially viable processor. However, with progressing VLSI scaling and software evolution, a 128-bit floating point architecture will be commercially viable in the future. In order to circumvent these problems, but at the same time provide for a solution to moving towards the future 128-bit floating point architecture, the present invention identifies and describes two enhanced floating point architectures as interim solutions.

One path toward the envisioned future architecture of block 11 is shown by path 15 which transitions from block 10 to block 13. An interim floating point architecture (identified as architecture A) of block 13 retains the floating point register file of the architecture of block 10. That is, the floating point registers 31 are retained as 80-bit registers. However, it is desirable for this architecture A to process quad precision-based calculations, in addition to the three previously described precision formats. In order to achieve this without significant additional cost in hardware, single, double and extended precision operations are still performed by the floating point execution unit(s) 25, but the quad precision operations are deferred to software emulation. Thus, when quad precision operations are required, an unsupported operation fault is generated and the operation is passed to the emulation software to complete the calculation.

As shown in FIG. 1, architecture A implements a FP register file 23 having a width of 80 bits. Accordingly, there is no support in hardware (which includes, registers 31 and execution units 25) for performing quad precision calculations in the floating point unit. Complete emulation of quad precision calculations is provided by the emulation software. In order to support the quad precision format, the memory 21 must be designed to accommodate the 128-bit floating point quad word format. That is, the memory 21 must be able to map the quad word format in order for the software to operate on the quad word format.

To reiterate, architecture A includes hardware (including floating point registers) to support single, double and extended precision operations only. The quad precision calculations are not supported by the hardware in the floating point unit at all. All quad precision calculations are supported by software emulation. Accordingly, for save/restore operations, only 80 bits need be moved for saving/restoring each floating point register. However, a problem with this approach is that software written for a processor implementing architecture A would suffer the inherent problem associated with the current architecture of block 10, when the future 128-bit floating point architecture of block 11 is ultimately implemented. That is, without some compensating mechanism in place, the software invoking the 80-bit save/restore operation will not be fully compatible with future 128-bit architecture, as will be noted below. The present invention provides this compensating mechanism by providing an adaptive load/store operation for saving/restoring registers.

Figure 6:
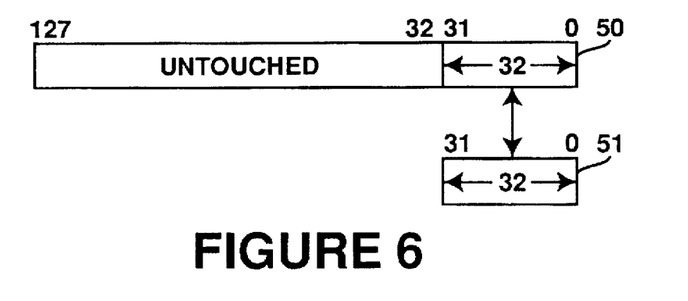
FIG. 6 illustrates a mapping of a 32-bit single precision word into an 128-bit memory boundary field using a general load and store instructions for single precision words.

It should be noted at this point that the mapping of single and double precision words into a 128-bit memory field can be achieved at word boundaries, making single (32 bits) and double (64 bits) word movements to/from memory 21 relatively simple. FIG. 6 illustrates the movement of a 32-bit single word 51 to and from memory location 50. Memory location 50 is a typical location in memory 21 in which the boundaries are mapped based on the 128-bit floating point format to accommodate the new quad precision format. As noted in FIG. 6, only 32 bits of the 128-bit field of location 50 are needed to accommodate the single word 51. The other 96 bit positions are not needed and are labeled "untouched" to indicate that the those bit locations are not used for this particular data storage. It is also evident that four such single words 51 can fill the 128-bit memory field.

Figure 7:
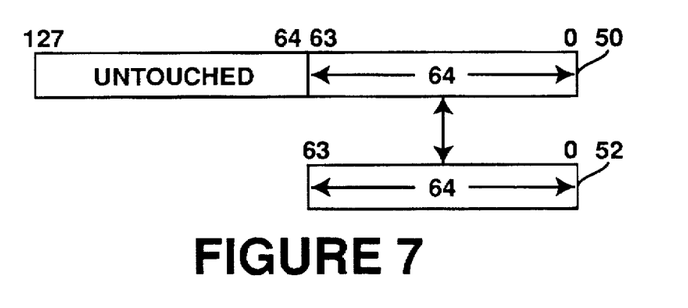
FIG. 7 illustrates a mapping of a 64-bit double precision word into an 128-bit memory boundary field using a general load and store instructions for double precision words.

FIG. 7 illustrates the movement of a 64-bit double word 52 to/from memory location 50. In this instance 64 bits of the 128 bit field are utilized. The remaining 64 bit positions are labeled as "untouched." How the remaining 64 bit positions are filled is a program choice. A typical response would be to fill the remaining 64 bit positions by another double word or two single words.

Figure 8:
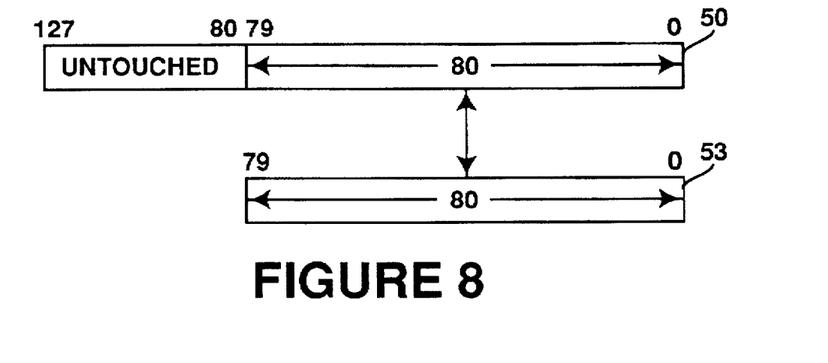
FIG. 8 illustrates a mapping of an 80-bit extended precision word into an 128-bit memory boundary field using a general load and store instructions for extended precision words.

FIG. 8 illustrates the movement of an 80-bit extended word 53 to and from memory location 50. In this instance, the 80 bits are right aligned (aligned to the least significant bit positions) so that the most significant 48 bits are not used. Although how these 48 remaining bit positions are filled is a program choice, the typical practice is to leave these bit positions blank and not use them at all for data storage. Significant amount of complexity in hardware and software is required to remap this uneven word boundary created as a result of storing an extended word.

Figure 9:
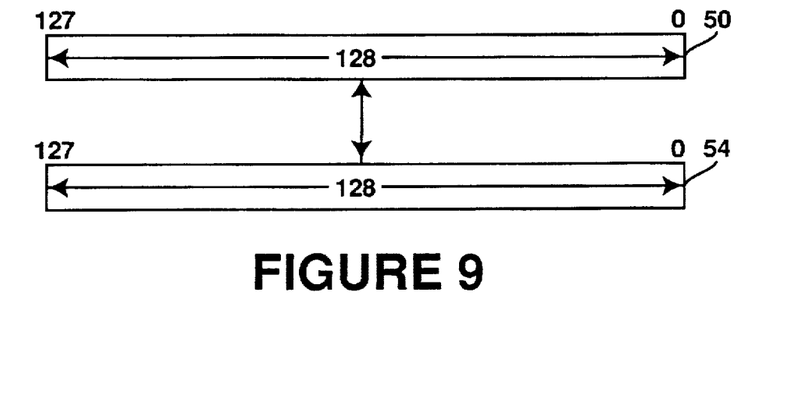
FIG. 9 illustrates a mapping of a 128-bit quadruple precision word into an 128-bit memory boundary field.

FIG. 9 illustrates the situation when quad word 54 is moved to/from memory 21 whenever quad precision data movement is invoked. Here, a one-to-one bit position match results without any unused bit positions remaining in the 128-bit field of location 50.

The current architecture of block 10 uses load and store (load/store) instructions for the extended word format to save/restore the floating point register image to memory 21. However, the continuing use of the existing 80-bit load/store instructions for saving/restoring floating point registers will encounter the same problems previously described when an 128-bit architecture is implemented which uses 128-bit floating point registers. Programs invoking the 80 bit save/restore operations for the floating point register image will lose (or corrupt) data if inter-operated with programs invoking the new 128 bit save/restore instructions for saving/restoring the floating point registers.

An alternative approach is to provide a load and store instruction set for operating on the new 128-bit floating point register architecture, but making the instruction set compatible with the current 80-bit floating point register structure. In the instance where the 80-bit registers are retained in the floating point register file 23, hardware circuitry is utilized to make the transition from 80 to 128 bits, and vice versa, as save/restore operations of the floating point register image are made to/from memory 21. Essentially, what this means is that the 80-bit register image transfer is made transparent by the 128-bit load/store instructions, so that the 80-bit register image transfer appears as an 128-bit register image transfer.

Returning to architecture A of block 13, the present invention calls for a new load and store instruction set that is based on the future 128-bit floating point register architecture, but which is made compatible with the current 80-bit floating point register architecture for save/restore operations performed on floating point registers. That is, the present invention specifies an additional store and load instructions for saving and restoring (respectively) contents of floating point registers, whether the register width is 80 bits or 128 bits. These load/store instructions are in addition to the current set of load and store instructions for moving data to/from memory based on single, double and extended format as shown in FIGS. 6–8. Thus, the new architecture A will support the transfer of single, double and extended word formats to/from floating point registers 31 using existing single/double/extended load and store instructions, but save/restore operations are performed by executing the new load/store instructions of the present invention.

Figure 10:
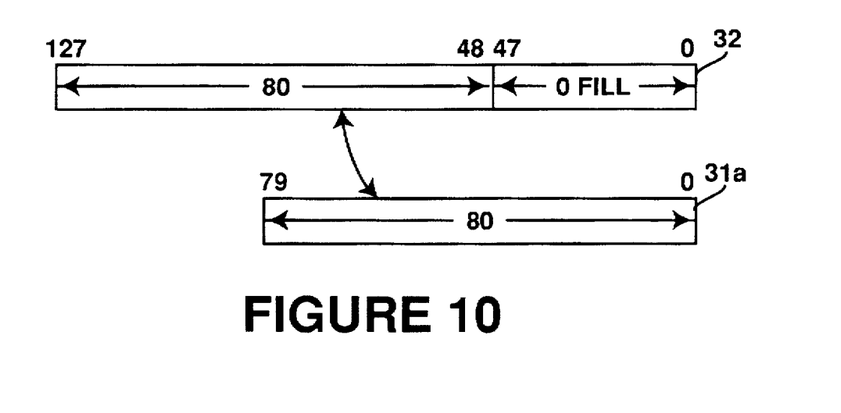
FIG. 10 illustrates a mapping of an 80-bit floating point register image into an 128-bit memory boundary field by utilizing the adaptive load and store instruction and a bit filling/discarding operation within a load/store unit in the practice of the present invention.
Figure 11:
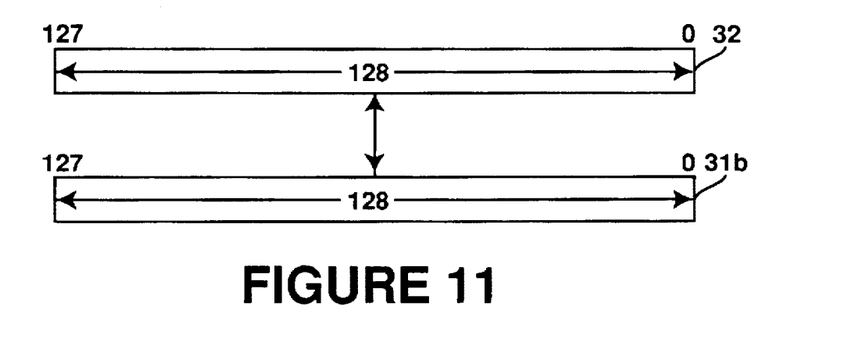
FIG. 11 illustrates a mapping of an 128-bit floating point register image into an 128-bit memory boundary field by utilizing the adaptive load and store instruction without the bit filling/discarding operation of FIG. 10 in the practice of the present invention.

How the present invention implements a single set of load/store instructions for saving/restoring floating point register images to/from locations 32 of memory 21 (whether the register width is 80 bits or 128 bits), are illustrated in FIGS. 10 and 11. FIG. 10 shows the instance when an 80-bit floating point register file is utilized, such as in architecture A. FIG. 11 shows the instance when a 128-bit floating point register file is utilized, such as in the future architecture of block 11 (of FIG. 1). Unlike the movement of the 80 bits for extended precision operations (shown in FIG. 8), the load/store instructions of the present invention causes the 80-bit register image of a floating point register 31a to be stored left aligned (most significant 80 bits) in the 128-bit field of location 32 of memory 21 (as shown in FIG. 10). The least significant 48 bits are filled with zeroes. The same instruction, when operating on a 128-bit floating point register 31b, will store to location 32 on a bit-for-bit transfer with no filling required (as shown in FIG. 11). Thus, the behavior of the instruction is adaptive, adapting itself to the width of the actual register file.

It is to be appreciated that significant advantages are derived by the use of load and store instructions of the present invention to save and restore the floating point registers. One primary advantage is the use of a single set of 128-bit load/store instructions for saving/restoring floating point registers, independent of which architecture is being used. The adaptive operation of this instruction set permits software to invoke the register save or restore operation without regard to the width of the floating point register in the processor. One preferred implementation to achieve this compatibility is described below in reference to FIGS. 12 and 13.

Figure 12:
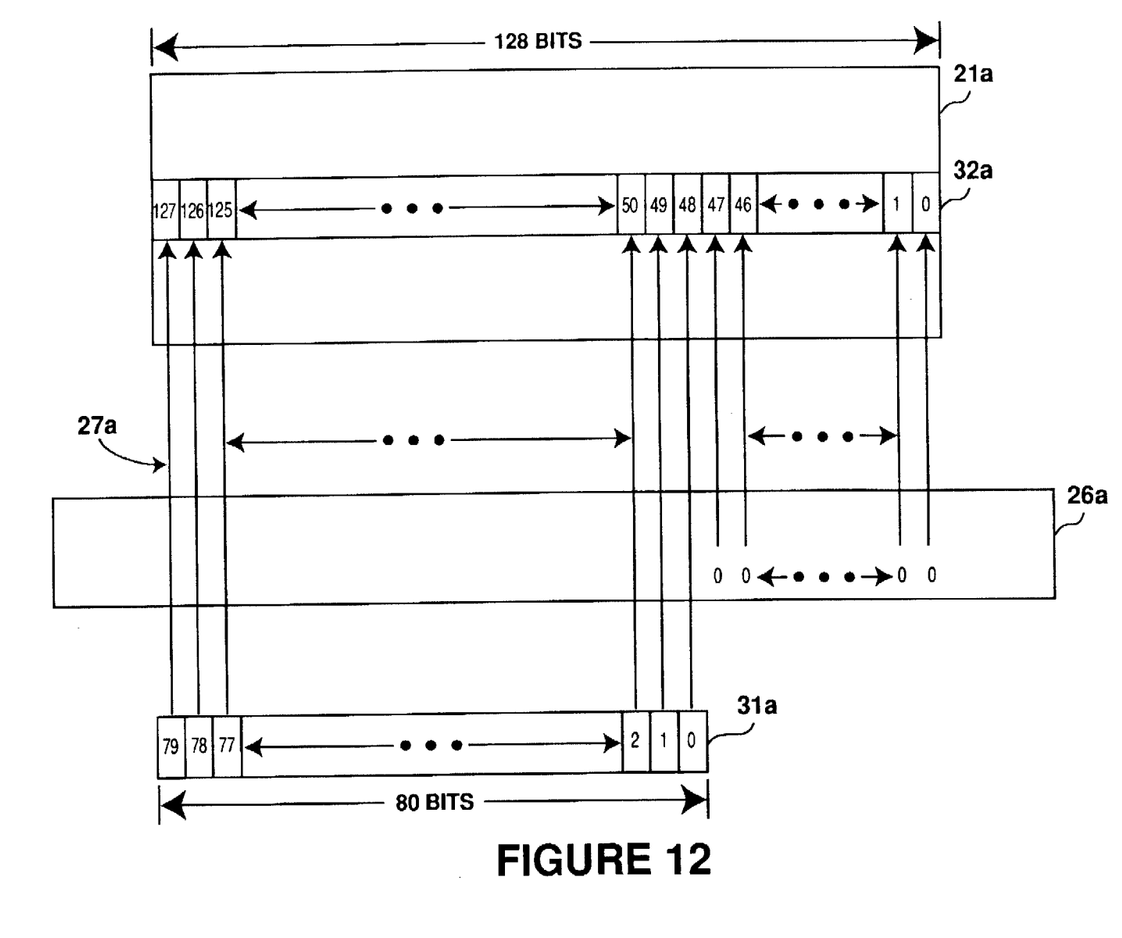
FIG. 12 illustrates an execution of a store instruction of the present invention in which data from an 80-bit floating point register is stored in memory by filling in the least significant bit positions of the 128-bit field with zeroes in order to map the 80-bit data into a 128-bit field.
Figure 13:
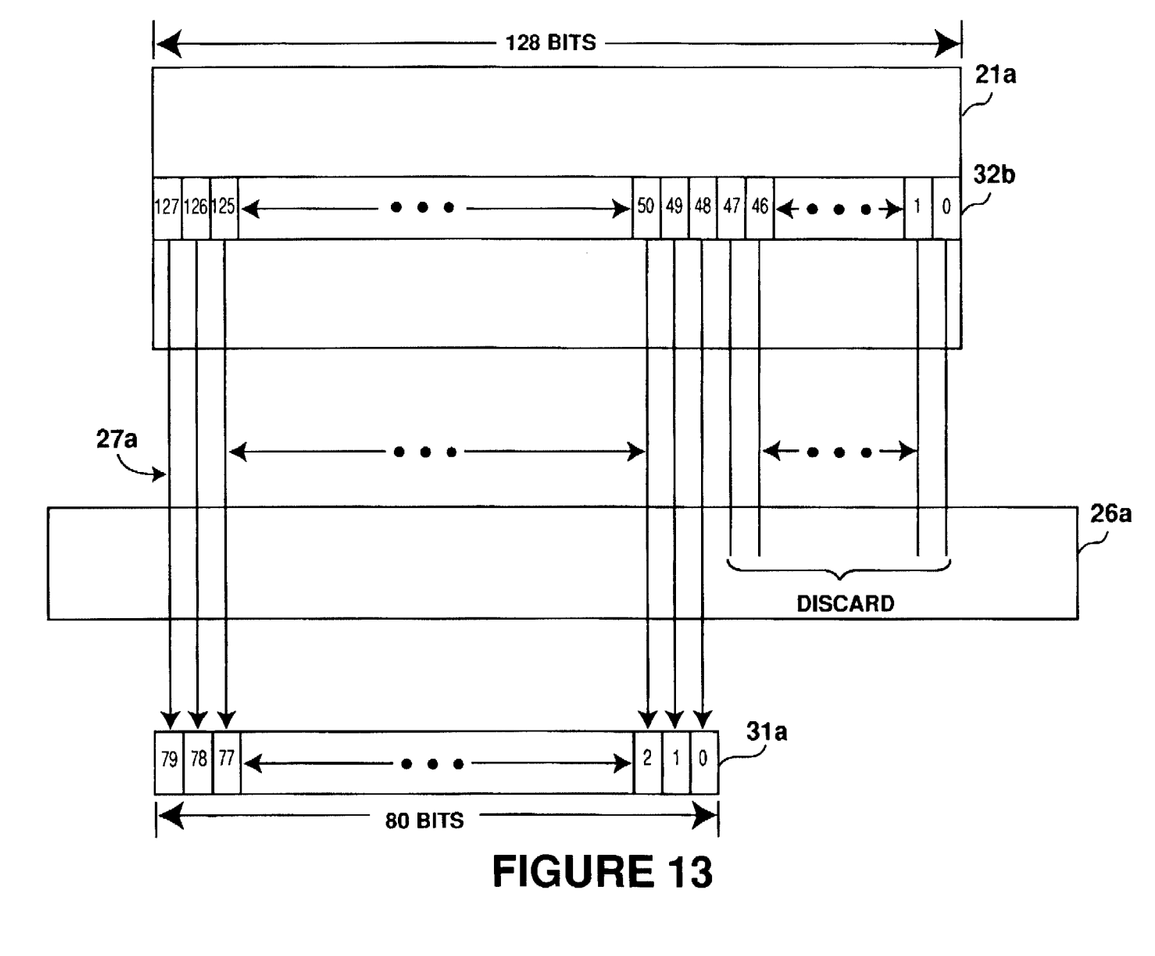
FIG. 13 illustrates an execution of a load instruction of the present invention for restoring the 80-bit data from an 128-bit location in memory by discarding the filled zeroes when data is to be loaded into an 80-bit floating point register.

Referring to FIGS. 12 and 13, the schematic diagrams illustrate a preferred scheme to map the contents of the 80-bit floating point registers to a 128-bit field in memory using the 128 bit load and store instructions of the present invention. One 80-bit floating point register 31a is shown coupled to a 128-bit memory location 32a of memory 21a. The numeric reference designation are the same as those shown in FIG. 2, but with the addition of "a" to designate that the circuitry applies to a particular implementation of the present invention (for example, architecture A in this instance). The transfer is achieved by bus 27a. The Figures show a 128-bit bus, but it is appreciated that the actual transfer may be done in multiple cycles (for example 2×64 bits on a 64 bit bus or 4×32 on a 32 bit bus). Generally, where 64-bit integer register file is implemented, bus 27a will most likely be a 64-bit bus.

In FIG. 12, the data flow is from register 31 a to the memory location 32a. A store operation causes the load/store unit 26a to store the contents of register 31a into location 32a. In FIG. 13, the data flow is from the memory location 32a to register 31a. A load operation causes the load/store unit 26a to load the contents of memory location 32a into register 31a. In order to accommodate the bit length difference, the load/store unit 26a adds or discards bits as the transfers are made.

During a store operation, bits 79:0 (read as bits 0 through 79, inclusive) of register 31a are transferred correspondingly to the most significant bit positions 127:48 of memory location 32a, which is shown in FIG. 12. The least significant 48 bits (bit locations 47:0) are filled ("padded") with zeros (0s) by the load/store unit 26a. Thus, whenever the store instruction of the present invention is executed to transfer the contents of the floating point registers, the system and memory will notice a 128 bit transfer from the floating point registers.

During a load operation, bits 127:48 of memory location 32a are moved correspondingly to bit position 79:0 of a receiving register 31a, which transfer is shown in FIG. 13. Bits 47:0 from memory location 32a are discarded in the load/store unit 26a. Thus, only the most significant 80 bits are moved to register 31a. This operation, if used in conjunction with the store operation above, will restore the contents of a particular floating point register 31a. The operations correspond to the movement of data illustrated in FIG. 10.

Accordingly, when a processor implements the floating point architecture A of block 13 according to the present invention, in which memory 21 is capable of mapping a quad word field for storage of data, the general information storage in memory 21 occur according to the illustrations of FIGS. 6-9, depending on the size of the word format. However, general load/store instructions for the load/store unit 26 will include single, double and extended format only (as shown in FIGS. 6-8). Whenever floating point register save/restore operations are required, the new 128-bit load and store instructions of the present invention are used according to the illustration of FIG. 10. As will be noted below, the dual use of this new load/store instruction set to operate on both 80-bit and 128-bit registers provide for an adaptive operative approach to obtain software compatibility.

It is appreciated that a variety of designs can be implemented to provide the load/store operations noted above. For example, by the appropriate selection of multiplexer inputs, the output fields can be properly aligned to map to the selected target. However, in the particular implementation of mapping 80 bits into 128 bits, the load/store unit 26 for the particular processor will have the zero fills hardwired in. That is, when the floating point register file has a width of 80 bits, the load/store unit 26 automatically fills in the zeros to the least significant 48 bit positions during the store (save) operation and discards them during the load (restore) operation.

Referring to FIG. 1 again, the architecture A of block 13 has a number of advantages, including those discussed previously. Primarily the advantages are in the areas of flexibility and cost savings. The scheme of the described embodiment is flexible in that only a slight modification is necessary to the existing architecture shown in block 10. Significant chip die area is saved, but capability for performing quad precision calculations is available through software. More importantly, existing program routines still maintain full compatibility with architecture A, since the processor of architecture A can "run" existing prior art routines invoking single, double and extended precision operations. New software being written for the processor of architecture A will now implement the new 128-bit load/store instructions of the present invention for any floating point register saves and restores. These new load/store instructions are adaptive in that the same instructions will be used when the processor architecture changes to implement a 128-bit floating point register file in the future.

In FIG. 1, two paths 17 and 19 are shown as extensions of the floating point architecture A. That is, the above-described architecture A can take either path to ultimately reach the future 128-bit architecture of block 11. Path 17 exemplifies a direct transition to the future architecture while path 19 transitions to a second interim architecture B, which is shown in block 14.

Architecture B is a second embodiment of the present invention. It is to be appreciated that architecture B can be implemented after the implementation of architecture A or, alternatively, architecture B can be implemented as a direct transition from the current architecture, as shown by path arrow 16 (in which instance architecture A would be by-passed). Floating point architecture B is also capable of supporting single, double, extended and quad precision, but again the quad precision operations are emulated in software. The same adaptive 128-bit load and store instructions of the present invention also operate in architecture B to save/restore the floating point register contents to/from memory. However, in this instance the floating point registers 31 are designed to be 128 bits wide, so that register save/restore operations are performed according to the illustration of FIG. 11. No transpositioning or filling of bits is required.

Essentially, architecture B is equivalent to architecture A except for the use of 128-bit registers in the floating point register file 23. A significant advantage of architecture B over architecture A is in the partial quad precision support now available in hardware. The quad words for software emulation can now reside in the floating point register file, since the floating point registers can accommodate the quad word format. Accordingly, software written for a processor implementing architecture B would include general load/store instructions for single, double, extended and quad precision formats (as shown in FIGS. 6–9) for the load/store unit 26, along with the new adaptive 128-bit load/store instructions for saving/restoring the floating point registers.

It is appreciated that architecture B would be implemented whenever the additional chip die area can be justified to fabricate a 128-bit floating point register file. Subsequently, a transition from architecture B to the future 128-bit floating point architecture can be achieved, as noted by path arrow 18. This final transition removes the software emulation for quad precision and support for it must now reside in the hardware, which will include floating point execution units 25 that are capable of supporting quad precision operations.

To reiterate, it is appreciated that the practice of the present invention permits a transition from the current floating point architecture of block 10 to the future 128-bit architecture of block 11 by three alternative paths. One path is the implementation of architecture A and then the transition to the future architecture 11. The second path is the implementation of architecture B and then the transition to the future architecture 11. Finally, the third path is the implementation of architecture A, followed by the implementation of architecture B and then the transition to the future architecture 11. Which path to choose is a product roadmap choice based on the cost of the chip die area required and the benefits available from the then state of software development.

In the instance transition 17 is made from architecture A to the future architecture of block 11, the 80-bit floating point registers would need to be replaced by a 128-bit register file and the execution units must now have the capability to operate in quad precision, as well as the other three lower precision formats. The load/store instructions for saving/restoring floating point registers need not be rewritten, since the load/store instructions of the present invention are designed and coded to operate either for 80-bit or 128-bit floating point registers.

In the instance transition 19 is made from architecture A to architecture B, only the floating point register files need to be changed to a 128-bit register file. However, the new programs written for the processor utilizing architecture B can take advantage of the presence of the wider register file. The 128-bit floating point registers allow for improved quad emulation, since quad words can now be stored in the floating point register file. Accordingly, the load/store unit 26 can now support quad word format load/store instructions, in addition to the single, double and extended precision formats to the floating point register file. Again, the same 128-bit load/store instruction of the present invention is used to save/restore the floating point registers. However, in this instance, the processor transfers all 128 bits to/from the floating point register file.

Thus, by utilizing the 128-bit load and store instructions of the present invention in relation to either or both of the two interim floating point architectures described herein, an efficient and cost saving alternative to providing quad precision computational compatibility is described. Furthermore, the implementations described herein permit continued compatibility of programs written for processors implementing earlier generation floating point architecture to inter-operate with programs written for processors of later generation, at least as to save/restore operations of floating point register contents. This compatibility is achieved without the need to rewrite the code for invoking the save/restore operations.

Compatibility of software written for each of the blocks of FIG. 1 will depend on the particular architecture and precision format used. For example, code written for the current floating point architecture of block 10 (referred to as generation 0) will run successfully on all future generation architectures (of blocks 11, 13 and 14), provided these programs do not inter-operate (where routines are combined to reach a result) with code from other generations. Generation 0 code will only inter-operate successfully with code from architecture A, since both generations use the 80-bit wide floating point register file.

In respect to code written for architecture A (generation A), the code will run single, double and extended precision operations on generation B (architecture B) and the future generation architecture of block 11. This compatibility is obtained whether the program runs with or without inter-operations with code from generation B or the future generation. This is due to the adaptive save/restore operation of the present invention. Quad precision code will also be compatible, but would not likely be used in this form in generation B or the future generation. Since architecture A uses full software emulation for quad precision operations, it would be preferable to remove such inefficiencies in subsequent generation processor architectures.

In respect to code written for architecture B, the code will run all precision format operations on the future generation architecture of block 11 with inter-operability. Although the presence of 128-bit floating point registers improves performance at the quad precision level, the software emulation of quad precision operations is still somewhat inefficient.

Finally, in respect to code written for the future generation architecture of block 11, the code is also backward compatible to run on generation B processors. In this instance, all quad operations are faulted to library functions for software emulation.

Accordingly, as described above, the present invention provides for a straightforward extension of the current architecture to eventually support a quadruple precision floating point unit, yet allowing for code compatibility during the interim stage(s) of development. Which path to take is a product roadmap choice based on the cost of the chip die area required and the benefits available from the then state of software development. The advantages for each stage of development are described above.

It is appreciated that the particular embodiment of the current architecture is based on the earlier-mentioned x86 architecture and the extension to the 128-bit architecture will encompass the backward compatibility to this architecture. However, it is appreciated that the scheme of the present invention need not be limited to the x86 architecture. Other processors and floating point architectures can readily adapt the present invention in order to comply with existing or future numerical standards. Finally, it is also to be noted that the processor embodying the present invention is typically utilized as a CPU (or one of the CPUs) in a computer system, such as a desktop or laptop personal computer (PC).

Thus, an invention is described in which a single set of load and store instructions provide for an adaptive save/ restore operations of contents of floating point registers to and from memory, independent of the width of the floating point registers.

I claim:

1. A computer system comprising:

a memory having a 128-bit boundary;

a processor which includes an execution unit that executes instructions, and a floating point unit having a floating point register file and a load/store unit, the load/store unit performing a bit transfer and mapping between the memory and the floating point register file in response to execution of a load instruction or a store instruction, and wherein the floating point unit is operable to perform single, double, and extended precision calculations on data stored in the floating point register file; and a software emulator that performs quad precision calculations on data stored in the memory;

execution of the store instruction transferring an 80-bit field of a first floating point register in the floating point register file to most significant bit positions of a 128-bit boundary field in the memory specified by an address, whereas execution of the load instruction specifying the address transferring the most significant bit positions of the 128-bit boundary field in the memory to a second floating point register in the floating point register file;

the load and store instructions being compatible with a new floating point architecture having 128-bit floating point registers.

2. The computer system of claim 1 wherein least significant bit positions of the 128-bit boundary field in the memory are filled with zeros in response to the store instruction.

3. The computer system of claim 1 wherein the least significant bit positions of the 128-bit boundary field in the memory are discarded in response to the load instruction.

* * * * *